United States Patent [19]
Weber

[11] Patent Number: 6,136,254
[45] Date of Patent: Oct. 24, 2000

[54] ROTARY TAKE-OUT APPARATUS FOR ROTARY BLOW-MOLDING MACHINES AND METHOD OF USE

[75] Inventor: Lawrence H. Weber, Ypsilanti, Mich.

[73] Assignee: R & B Machine Tool Company, Saline, Mich.

[21] Appl. No.: 09/112,043

[22] Filed: Jul. 8, 1998

[51] Int. Cl.[7] ............................. B29C 49/36; B29C 49/70
[52] U.S. Cl. .......................... 264/334; 425/444; 425/537; 425/540
[58] Field of Search ................................. 425/537, 444, 425/540; 264/334; 198/468.2

[56] References Cited

U.S. PATENT DOCUMENTS

| | | | |
|---|---|---|---|
| 3,881,855 | 5/1975 | Farkas ....................................... | 425/540 |
| 3,949,860 | 4/1976 | Bilodeau ................................. | 425/537 |
| 3,981,667 | 9/1976 | Bilodeau ................................. | 198/443 |
| 4,251,203 | 2/1981 | Oas ......................................... | 425/537 |
| 4,456,118 | 6/1984 | Kauffman et al. ...................... | 198/579 |
| 4,752,206 | 6/1988 | Nowicki et al. ......................... | 425/537 |
| 4,824,630 | 4/1989 | Mohney ................................... | 425/522 |
| 4,834,643 | 5/1989 | Klinedinst et al. ...................... | 425/537 |

OTHER PUBLICATIONS

Talco Inc., 9300 Rotary Union, http://www.primenet.com/~talco/9300.html, first published 1996.

Primary Examiner—Robert Davis
Attorney, Agent, or Firm—Reising, Ethington, Barnes, Kisselle, Learman & McCulloch, P.C.

[57] ABSTRACT

A rotary take-out apparatus for removing blow-molded articles from rotary blow-molding machine molds. The apparatus includes a rotary take-out carrousel and a take-out carrousel drive configured to rotate the take-out carrousel. Pick-up stations on the take-out carrousel rotate along a circular pick-up station path. Each station includes a pick-up head array comprising at least one pick-up head. Fluid cylinders are supported on the take-out carrousel and are each operatively connected to one of the pick-up head arrays. Each cylinder is configured to move a pick-up head array between extended and retracted positions when differential fluid pressure is directed to respective first and second chambers in the cylinder. Each pick-up head is configured to releasably grasp a blow-molded article. Cylinder valves are supported on the take-out carrousel and are connected between each cylinder and a source of differential fluid pressure. Each cylinder valve alternately diverts differential fluid pressure to the first and second chambers of a cylinder. A controller coordinates the motions of the pick-up heads, take-out carrousel, and mold carrousel to grasp and remove blow-molded articles from the molds and to release them at a point spaced from the mold carrousel.

30 Claims, 4 Drawing Sheets

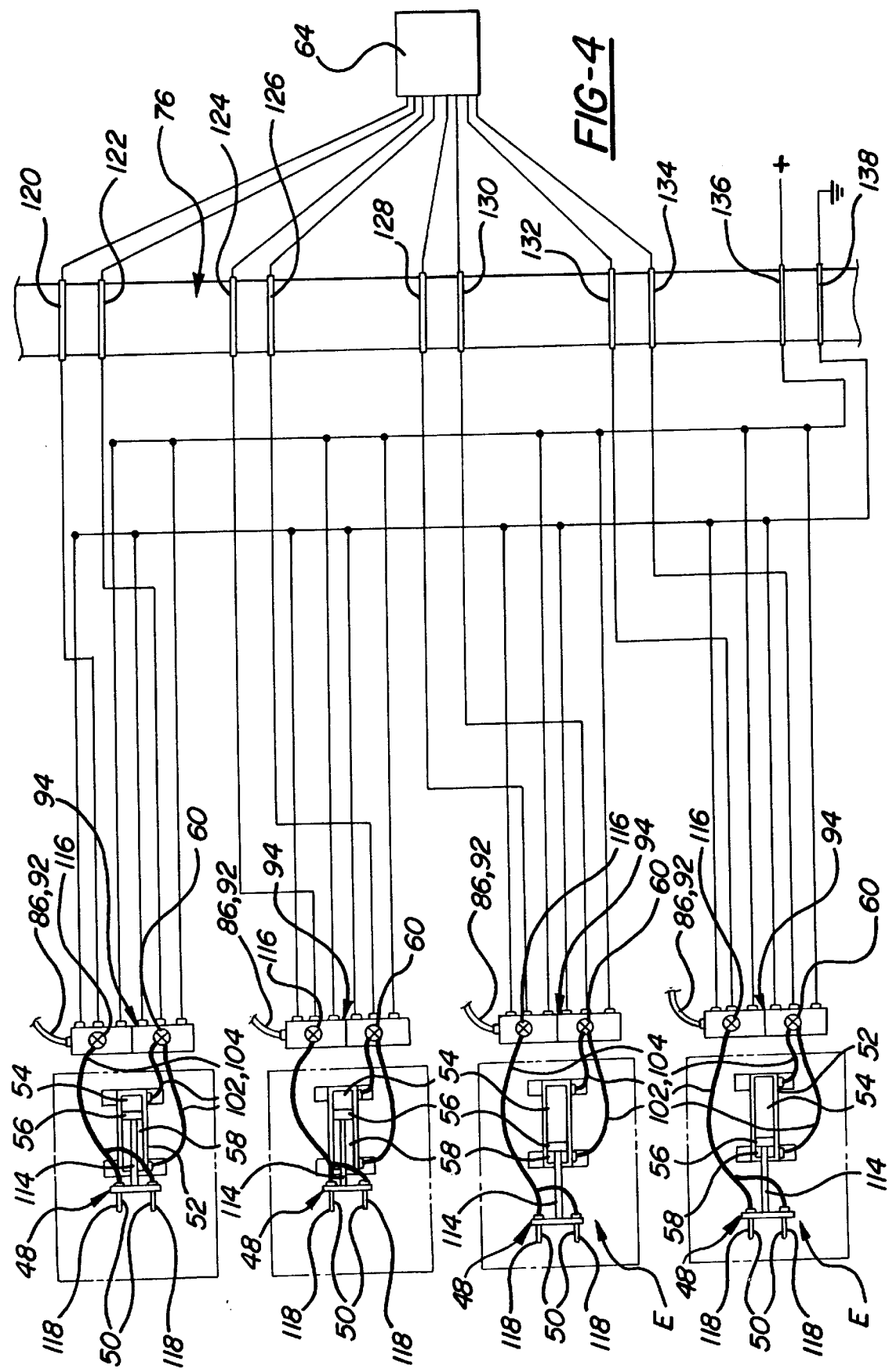

ROTARY TAKE-OUT APPARATUS FOR ROTARY BLOW-MOLDING MACHINES AND METHOD OF USE

TECHNICAL FIELD

This invention relates generally to a take-out apparatus for sequentially removing blow molded hollow articles from each of a plurality of molds that are mounted on a rotary mold carrousel in a rotary blow-molding machine.

BACKGROUND OF THE INVENTION

Current blow-molding machinery is designed to manufacture hollow plastic containers by extruding a parison between opposed, parted mold halves. The mold is then closed and air is injected into the parison, blowing and distending it outward so that it conforms itself to inner contours of the mold that complement the outer shape of the bottle to be produced. Once the distended parison has hardened into a container, a take-out mechanism extracts the newly formed container from the mold.

Some plastic bottle manufacturers produce blow-molded articles by using rotary blow-molding machines. A typical rotary blow-molding machine includes a rotating mold carrousel that carries two or more mold stations around a circular mold station path. Each mold station includes a mold with a mold cavity. The mold carrousel is indexed to hold each mold station momentarily motionless at each of a series of blow molding "work stations". A "work station" is a position where each mold station must pause in its circular path for a particular operation to be carried out. A "work station series" is a progression of work stations necessary to complete a blow molding process on a single mold station in a single mold carrousel revolution. Blow molding operations are carried out sequentially on each mold as each mold station rotates through a work station series, pausing momentarily at each work station in the series.

Rotary blow-molding machines may include any number of mold and work stations, and may include more than one work station series arranged around a single mold station path.

The final work station in a work station series is the article take-out work station. It is at this work station that an article take-out mechanism releases or extracts the blown articles from their respective molds. An article take-out mechanism can be configured to remove articles from molds while the molds are paused momentarily at the article take-out work station. Alternatively, an article take-out mechanism can be configured to remove articles "on the fly" as each mold passes the article take-out work station, i.e., without pausing mold carrousel rotation.

An example of the latter of those two types of take-out mechanisms that removes articles "on the fly" is shown in U.S. Pat. No. 4,902,217 (the '217 patent) issued to Martin et al. This patent discloses a rotary take-out mechanism with an oscillating turret arm mounted adjacent a mold carrousel at an article take-out work station. One end of the turret arm is pivotally mounted to a mold carrousel axle. The other end of the turret arm, i.e., the "outer" end, extends radially outward from the mold carrousel axis beyond the mold carrousel outer diameter. A take-out member is mounted on the turret arm outer end. As the molds revolve around the mold carrousel axle, the turret arm repeatedly swings the take-out member upward and downward through a small arcuate path just outside the circular path of the molds as the molds pass the take-out work station. The downward swing of the turret arm matches the movement of the orbiting molds thus canceling relative motion between the molds and the take-out member over a small arcuate distance. This temporary lack of relative motion provides enough time for the take-out member to engage and extract blown articles from the molds as they pass the take-out work station.

The take-out member of the Martin et al. patent comprises four pneumatically actuated article-engagement members mounted at spaced locations around the circumference of a take-out carrousel. The article-engagement members are individually supplied with pressurized air through separate pneumatic feeds. The feeds are separated by channels in the hub. This allows a controller mounted off the carrousel to sequentially direct pressurized air to each article engagement member through the separate pneumatic feeds through the hub and a rotary union that channels air into the hub from the controller. The take-out carrousel is rotatably mounted at the turret arm outer end on an axis parallel to that of the mold carrousel axis. The take-out carrousel is synchronized to rotate in an angular direction opposite that of the mold carrousel. As each article-engagement member rotates past a mold carrousel mold it engages a blown article, removes it from its mold, rotates it downward and away from the mold carrousel, and places it in an upright position on an article-conveyor mechanism.

Take-out mechanisms of the type disclosed in the Martin et al. patent are inherently complex as they must synchronize with and track the continuous arcuate motion of the molds as the molds pass an article take-out work station. In addition, it takes considerable energy to repeatedly reverse the path of a turret arm that carries a take-out carrousel as described in the Martin et al. patent. Still further, the separate pneumatic feeds complicate the structure of the hub and rotary union.

Another example of a rotary take-out apparatus for removing blow-molded articles "on the fly" from a non-indexed, continuously rotating mold is disclosed in the Bilodeau U.S. Pat. No. 3,981,667 (the Bilodeau patent). The Bilodeau take-out apparatus includes a vertically-oriented rotatably-mounted take-out carrousel with three pick-up stations disposed at circumferentially-spaced locations on the take-out carrousel. A rotary union channels air through a hollow hub portion of the take-out carrousel to the pick-up stations. Pneumatic hoses channel the air from the hub to air valves located at each of the take-out stations. Each air valve provides air pressure to pick-up heads at each pick-up station.

However, the Bilodeau apparatus is unable to use pneumatic pressure to drive its pick-up heads in and out. Instead, it requires mechanical interaction between a journalled roller and a stationary cam slot mounted adjacent the take-out carrousel. In addition, the Bilodeau pick-up heads comprise suction cups that cannot attach to the open end of a blow-molded article. Instead, the suction cup pick-up heads disclosed in Bilodeau are provided with negative air pressure (a vacuum) to attach via suction to flat, smooth outer surfaces of newly blow-molded articles. In addition, the air valves disclosed in Bilodeau for supplying negative air pressure to the pick-up heads cannot be electrically actuated and instead rely on mechanical actuation through the above-described interface of a roller with a stationary cam slot. Moreover, the Bilodeau patent discloses no structure capable of supplying electrical power or signals to components mounted on the take-out carrousel. Still further, the Bilodeau patent discloses no structure capable of extending and retracting the pick up heads or operating the air valves while the carrousel is not moving.

What is needed is a rotary take-out apparatus that does not require an oscillating turret arm or similar structure to provide synchronized motion to allow the apparatus can engage and remove blow-molded articles from a rotary blow-molding machine. What is also needed is such an apparatus that does not require carrousel rotation or mechanical interaction between components mounted on the carrousel and components mounted off the carrousel to provide reciprocal pick-up head motion and to sequence air valves that actuate pick-up heads.

INVENTION SUMMARY

In accordance with this invention a rotary take-out apparatus is provided that includes a fluid cylinder and a cylinder valve that are supported on a take-out carrousel and cooperate to move a pick-up head array between an extended position and a retracted position to retrieve hollow blow-molded articles from a rotary blow-molding machine. The take-out carrousel is supported for rotation about a take-out carrousel axis. A take-out carrousel drive is operatively connected to the take-out carrousel and is configured to cause the take-out carrousel to rotate around the take-out carrousel axis. A pick-up station is supported on the take-out carrousel to rotate along a circular pick-up station path. The pick-up head array is supported on the carrousel at the pick-up station. The fluid cylinder is operatively connected to the pick-up head array. The cylinder is configured to move the pick-up head array to the extended position when differential fluid pressure is directed to a first chamber in the cylinder. The cylinder is configured to move the pick-up head array to a retracted position when differential fluid pressure is diverted from the first chamber to a second chamber in the cylinder. Each pick-up head is configured to releasably grasp a blow molded article while in the extended position. The cylinder valve is connected between a source of differential fluid pressure and the first and second chambers of the cylinder. The cylinder valve is configured to alternately divert differential fluid pressure to one of the first and the second chamber in the cylinder at one time. A controller is connected to the cylinder valve and is configured to operate the cylinder valve to coordinate pick-up head extension and retraction with the motion of the take-out carrousel and the motion of the mold carrousel and the opening and closing of the molds at the article take-out work station on the mold carrousel.

In accordance with another aspect of the invention at least two of the pick-up stations are disposed at circumferentially-spaced locations on the take-out carrousel. Each pick-up station includes a pick-up head array. At least two of the fluid cylinders are supported on the take-out carrousel. Each fluid cylinder is operatively connected to one of the pick-up head arrays. At least two of the cylinder valves are supported on the take-out carrousel. Each cylinder valve is connected between the hub and the first and second chambers of one of the cylinders. At least one fluid channel extends from the hub to the cylinder valves. The controller is connected to each cylinder valve and is configured to operate each cylinder valve to coordinate extension and retraction of each pick-up head array with the motion of the mold carrousel and the opening and closing of the molds at the article take-out work station. The additional pick-up stations, pick-up head arrays and fluid cylinders allow more blow-molded articles to be removed from a rotary blow molding machine for each revolution of the take-out carrousel.

In accordance with another aspect of the invention, the take-out carrousel includes a hollow hub portion coaxially disposed along the take-out carrousel axis. A rotary union is connected to the hub. The rotary union provides fluid communication between the hub and a source of differential fluid pressure disposed adjacent the carrousel. At least one fluid channel extends from the source of differential fluid pressure through the rotary union and hub to the chambers of the fluid cylinder. The hollow hub and rotary union provide a means of delivering compressed air or hydraulic fluid to operate the cylinders mounted on the take-out carrousel.

In accordance with another aspect of the invention, a platform is movably mounted on the take-out carrousel at each take-out station. Each pick up head array is supported on one of the platforms. Each platform is configured to transport a pick up head array reciprocally between the extended and retracted positions.

In accordance with another aspect of the invention, a pair of parallel rails is mounted on the take-out carrousel at each take-out station.

Each platform is slidably mounted for reciprocal motion on one of the pairs of parallel rails.

In accordance with another aspect of the invention, the apparatus is further configured to release blown articles in an upright position. The upright orientation of the blown articles allows subsequent operations such as tail flash trimming and filling to take place without having to first re-orient the articles.

In accordance with another aspect of the invention, the take out carrousel drive is configured to index the rotation of the take-out carrousel to synchronize with the indexed rotation of a mold carrousel. The synchronized motion allows the take-out carrousel take-out stations to "line up" with and pause adjacent mold carrousel mold stations.

In accordance with another aspect of the invention, at least two head valves are supported on the carrousel. Each head valve is connected between one of the pick-up head arrays and the hub. Each head valve is individually actuable to control the flow of differential fluid pressure from the hub to the pick-up heads in one of the pick-up head arrays. Each pick up head is configured to alternately grasp and release a blow-molded article in response to changes in the controlled flow of differential fluid pressure. The controller is connected to the head valves and is configured to coordinate individual head valve actuation with the reciprocal motion of the pick up head arrays and the rotation of the take-out carrousel. Supporting the head valves on the carrousel obviates the need to route multiple differential fluid pressure channels from non-rotating differential pressure sources to the rotating pick-up heads on the take-out carrousel. Instead, all carrousel-mounted differential fluid pressure operated components receive differential fluid pressure from a single source - the carrousel hub.

In accordance with another aspect of the invention, each pick-up head includes an expandable pin. The expandable pins in each pick-up head array are configured to inflate when a head valve admits pressurized fluid to the pick-up heads in that pick-up head array. The pins in each pick-up head array are configured to deflate when a head valve blocks the flow of pressurized fluid from the hub to the pins and pressurized fluid is released from the pins. The use of expandable pins allows the take-out apparatus to grip blow-molded articles from inside an opening such as a neck or spout rather than requiring a flat, smooth outer surface of each newly-molded article be presented to the pick-up heads of the apparatus as with prior-art suction cup systems.

In accordance with another aspect of the invention, at least two four-way solenoid valves are supported on the carrousel. Each four-way solenoid valve includes one of the cylinder valves and one of the head valves. The use of a single four-way valve rather than separate valves reduces the number of parts that must be assembled on the take-out carrousel in the manufacturing process.

In accordance with another aspect of the invention a plurality of slip rings is disposed around the hub and is configured to complete electrical circuits between the controller and the cylinder valves and between the controller and the head valves. The slip rings provide a durable and reliable means of signaling and powering the carrousel-mounted valves from a point located off the carrousel.

In accordance with another aspect of the invention a rotary blow-molding apparatus of the type for blow-molding hollow articles is provided that comprises a support frame and a mold carrousel supported on the frame for rotation about a central mold carrousel axis. A mold carrousel drive is operatively connected to the carrousel and is configured to rotate the mold carrousel about the mold carrousel axis. At least two mold stations are supported on the mold carrousel to rotate along a circular mold station path. Each mold station includes at least one mold, each mold including a pair of mold sections closeable and openable by reciprocal movement toward and away from one another and defining a mold cavity when in the closed position. Each mold cavity is adapted to shape and hold a blow molded article during blow molding. At least two work stations are disposed adjacent the support frame and are angularly spaced from each other around the mold station path. One of the work stations is an article take-out work station. A mold section reciprocator is operable to open the molds of each mold station before each mold station departs the article take-out work station. The mold carrousel drive includes an indexer that is operatively connected to the carrousel and is configured to pause the mold carrousel in a number of indexing positions. The indexing positions and work stations are angularly spaced so that each mold station pauses in angular alignment with each work station allowing operations to be performed on each mold station at each work station. The rotary blow molding apparatus also includes a rotary take-out apparatus. The rotary take-out apparatus comprises a take-out carrousel supported for rotation about a take-out carrousel axis. A take-out carrousel drive is configured to rotate the take-out carrousel about the take-out carrousel axis. A pick-up station is supported on the take-out carrousel to rotate along a circular pick-up station path between a take-out position adjacent the article take-out work station and a release position displaced from the article take-out work station. The pick up station includes a pick-up head array comprising at least one pick-up head. The take-out carrousel drive includes an indexer that is operatively connected to the carrousel and is configured to pause the take-out carrousel when the pick-up station is disposed in the take-out position. The pick-up head array is reciprocally moveable between an extended position and a retracted position. Each pick-up head is configured to releasably grasp a blow molded article disposed in a mold paused at the article take-out work station when the pick up head array is in the extended position and to release the article once the take-out carrousel has rotated the pick-up station to the release position. A controller is operatively connected to the pick-up head array and is configured to move the pick-up head array to the extended position when the pick-up station is in the take-out position and a mold is paused at the article take-out work station. This allows the take-out apparatus to grasp and remove blow-molded articles from a mold carrousel mold while the take-out carrousel and mold carrousel are stationary.

In accordance with another aspect of the invention, the rotary blow molding apparatus includes a fluid cylinder supported on the take-out carrousel. The fluid cylinder is operatively connected to the pick-up head array and is configured to reciprocally drive the pick-up head array between an extended position and a retracted position in response to changes in fluid pressure supplied to the cylinder. The fluid cylinder may be configured to move the pick-up head array to an extended position when differential fluid pressure is directed to a first chamber in the cylinder. The cylinder may also be configured to move the pick-up head array to a retracted position when differential fluid pressure is directed to a second chamber in the cylinder.

In accordance with another aspect of the invention an even number of the pick-up stations are supported on the take-out carrousel. The stations are disposed such that one of the stations is disposed in the pick-up position whenever another of the stations is disposed in the release position. The incorporation of an even number of pick-up stations minimizes take-out carrousel pauses because two operations can be performed during each pause.

In accordance with another aspect of the invention, the take-out carrousel drive is operatively connected to the mold carrousel drive. The take-out carrousel drive is configured to pause the take-out carrousel such that a pick up station is disposed in the take-out position when a mold is disposed at the article take-out work station. The use of a single drive to power and index both the mold carrousel and the take-out carrousel reduces the cost of manufacturing a rotary blow molding apparatus according to the invention.

In accordance with another aspect of the invention a method is provided for making hollow blow-molded articles by first positioning the rotary take-out carrousel such that the article take-out work station is disposed adjacent the take-out position of the take-out carrousel then rotating a mold containing a blow-molded article to the article take-out work station. One of the pick-up stations is then rotated to the take-out position and a pick-up head disposed at the pick-up station is moved to an extended position adjacent the blow-molded article. The pick-up head is then caused to grasp the blow-molded article disposed in the mold at the article take-out work station. The mold containing the blow-molded article is then opened and the pick-up head is moved to a retracted position clear of the mold. The pick-up station is then rotated to the release position where the pick-up head releases the blow-molded article.

According to another aspect of the inventive method, the mold carrousel is paused with the mold at the article take-out work station while the take-out carrousel is paused with the pick-up station in the take-out position.

According to another aspect of the inventive method, when the pick-up head is moved to the extended position an expandable pin portion of the pick-up head is inserted into an opening in the blow-molded article. The expandable pin is then inflated to cause the pick-up head to grasp the blow-molded article from within the opening.

According to another aspect of the inventive method, the expandable pin is inflated by providing pressurized fluid from a source of such pressurized fluid disposed off the take-out carrousel to the expandable pin supported on the take-out carrousel.

According to another aspect of the inventive method, the expandable pin is inflated by sending electrical signals from a source disposed off the take-out carrousel to an electrically-controlled head valve supported on the take-out carrousel According to another aspect of the inventive method, a pick-up head is moved between an extended position and a retracted position by providing differential fluid pressure from a source of differential fluid pressure disposed off the take-out carrousel to a fluid cylinder mounted on the take-out carrousel.

According to another aspect of the inventive method, differential pressure is provided to a fluid cylinder by sending electrical signals from a source disposed off the take-out carrousel to an electrically-controlled cylinder valve supported on the take-out carrousel. In response, the cylinder valve directs differential fluid pressure to portions of the cylinder that move the pick-up head between the extended and retracted positions.

BRIEF DRAWING DESCRIPTION

To better understand and appreciate the invention, refer to the following detailed description in connection with the accompanying drawings:

FIG. 4 is a schematic block diagram of the electrical components and current paths on a take-out carrousel portion of the take-out apparatus of FIGS. 1–3.

PREFERRED EMBODIMENT DESCRIPTION

Figure 1:
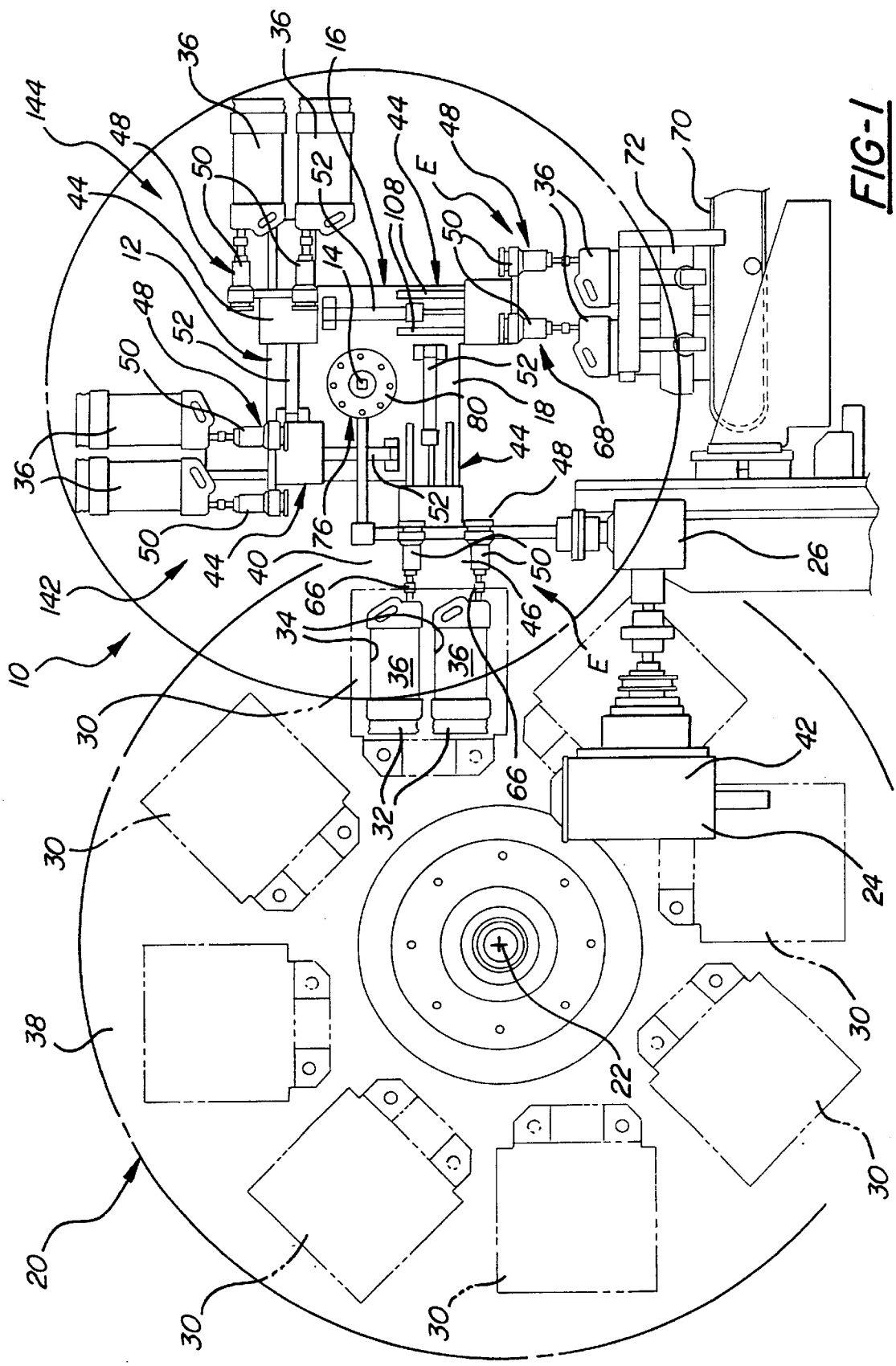
FIG. 1 is a front view of a rotary take-out apparatus removing blow-molded bottles from and being driven by a diagrammatically represented mold carrousel and placing the bottles on a diagrammatically represented tail flash trimmer and conveyer belt.

A rotary take-out apparatus for sequentially removing blow molded hollow articles from each of a plurality of molds that are mounted on a rotary mold carrousel in a rotary blow-molding machine is generally shown at 10 in FIG. 1. The apparatus 10 comprises a take-out carrousel generally indicated at 12 in FIGS. 1–3. The take-out carrousel 12 is supported for rotation about a take-out carrousel axis shown at 14 in FIGS. 1-3. The take-out carrousel 12 includes a generally square flat mounting plate, generally indicated at 16 in FIGS. 1–3, that has an outer surface 18 configured to support a number of other carrousel components.

In FIG. 1 the take-out carrousel 12 is shown mounted adjacent a mold carrousel 20 of a rotary blow-molding machine. The mold carrousel 20 is supported for rotation on a support frame [not shown] about a central mold carrousel axis shown at 22 in FIG. 1. As shown in FIG. 1, the mold carrousel axis 22 is disposed parallel to the take-out carrousel axis 14. A mold carrousel drive shown at 24 in FIG. I is operatively connected to the carrousel and is configured to rotate the mold carrousel 20 about the mold carrousel axis 22. The mold carrousel drive 24 is also operatively connected to a take-out carrousel drive shown at 26 in FIGS. 1–3. The take-out carrousel drive 26 is operatively connected to an inner surface 28 of the take out carrousel mounting plate 16 and is configured to cause the take-out carrousel 12 to rotate around the take-out carrousel axis 14. In other words, the mold carrousel drive 24 provides power to rotate both the mold carrousel 20 and the take-out carrousel 12. The take-out carrousel drive 26 is configured to index the rotation of the take-out carrousel 12 to synchronize with the indexed rotation of the mold carrousel 20.

Figure 2:
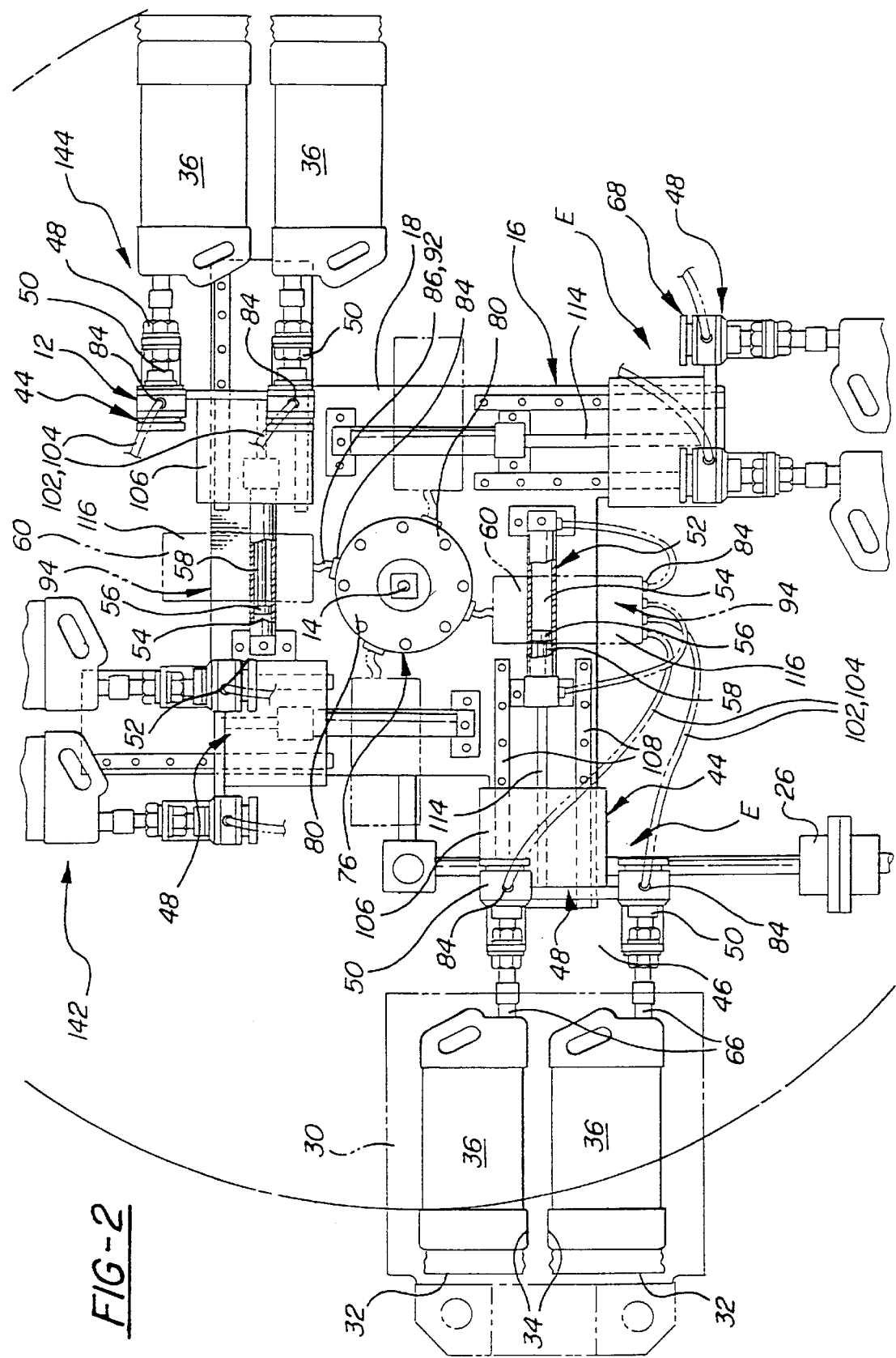
FIG. 2 is a magnified view of the rotary take-out apparatus of FIG. 1.

Eight mold stations, shown at 30 in FIGS. 1 and 2, are supported on the mold carrousel 20 to rotate along a circular mold station path. Each of the eight mold stations 30 includes two molds 32. Each mold 32 includes a pair of mold sections closeable and openable by reciprocal movement toward and away from one another. The two mold sections of each mold 32 define two mold cavities 34 when in the closed position. Each mold cavity 34 is adapted to shape and hold a blow molded article, shown at 36 in FIGS. 1–3, during blow molding. In other embodiments, the take-out carrousel 12 may be configured to withdraw any number of blow-molded articles 36 from any number of mold cavities 34 located at each mold station 30. Other embodiments of the take-out carrousel 12 may also be configured to service mold carrousels having more or less than eight mold stations.

At least two work stations, shown at 38 and 40 in FIGS. 1 and 2, are disposed adjacent the mold carrousel support frame. The work stations 38, 40 are angularly spaced from each other around the mold station path as is best shown in FIG. 1. One of the work stations is an article take-out work station 40 and the other of the stations is an extrusion work station 38. An extruder [not shown] is typically disposed at the extrusion work station 38. The extruder is adapted to extrude parison into each mold 32 as each mold 32 pauses at the extrusion work station 38. The article take-out work station 40 is where blow-molded articles 36 are removed from their respective mold cavities 34 at the end of the blow molding process.

A mold section reciprocator [not shown] is operable to open the molds 32 of each mold station 30 before each mold station 30 departs the article take-out work station 40. The mold carrousel drive 24 includes an indexer, shown at 42 in FIG. 1, that is operatively connected to the mold carrousel 20 and is configured to pause the mold carrousel 20 in a number of indexing positions. The indexing positions and work stations are angularly spaced so that each mold station 30 pauses in angular alignment with each work station 38, 40 allowing operations to be performed on each mold station 30 at each work station 38, 40.

A four mold-station version of the eight mold-station carrousel 20 shown in FIG. 1 is described in detail in the '217 patent. The description of the carrousel in the '217 patent is incorporated herein by reference. However, the take-out carrousel 12 may be employed to extract blow-molded articles from any suitable mold carrousel to include those described in U.S. Pat. Nos. 5,665,404 and 4,421,472. These patents are also assigned to the assignee of the present invention and are incorporated herein by reference.

The take-out apparatus 10 includes four pick-up stations generally indicated at 44 in FIGS. 1–4. The pick-up stations 44 are supported at circumferentially-spaced locations around the take out carrousel mounting plate 16. The take-out carrousel 12 carries the four pick-up stations 44 along a circular pick-up station path. The take-out carrousel drive 26 is configured to pause the take-out carrousel 12 such that a pick-up station 44 is disposed in a take-out position 46 adjacent the article take-out work station 40 when a mold 32 is disposed at the article take-out work station 40. Four pick-up head arrays 48, generally indicated at 48 in FIGS. 1–4, are supported on the take-out carrousel 12. Each pick up head array 48 comprises two pick-up heads shown at 50 in FIGS. 1–4. Each of the four pick-up head arrays 48 is disposed at one of the four pick-up stations 44. Four air cylinders, shown at 52 in FIGS. 1–4, are supported on the take out carrousel mounting plate 16. Each of the four air cylinders 52 is disposed at one of the four pick-up stations 44 and is operatively connected to the pick-up head array 48 located at the same pick-up station 44. Each air cylinder 52 is configured to move one of the pick-up head arrays 48 to an extended position when differential fluid pressure in the form of pressurized air is directed to a first chamber 54 in the cylinder 52. Pick up head arrays are shown in the extended position at "E" in FIGS. 1, 2 and 4.

The air cylinder 52 is configured to move the pick-up head array 48 to a retracted position when pressurized air is diverted from a first chamber 54, disposed ahead of a piston 56 in the cylinder 52; to a second chamber 58, disposed behind the piston 56 in the cylinder 52. In other words, when pressurized air is no longer supplied to the first chamber 54 but is instead supplied to the second chamber 58, the air cylinder 52 moves the pick-up head array 48 to the retracted position. The first and second chambers 54, 58 and the piston 56 are shown in cutaway views of cylinders in FIG. 2 and diagrammatically in FIG. 4.

Figure 3:
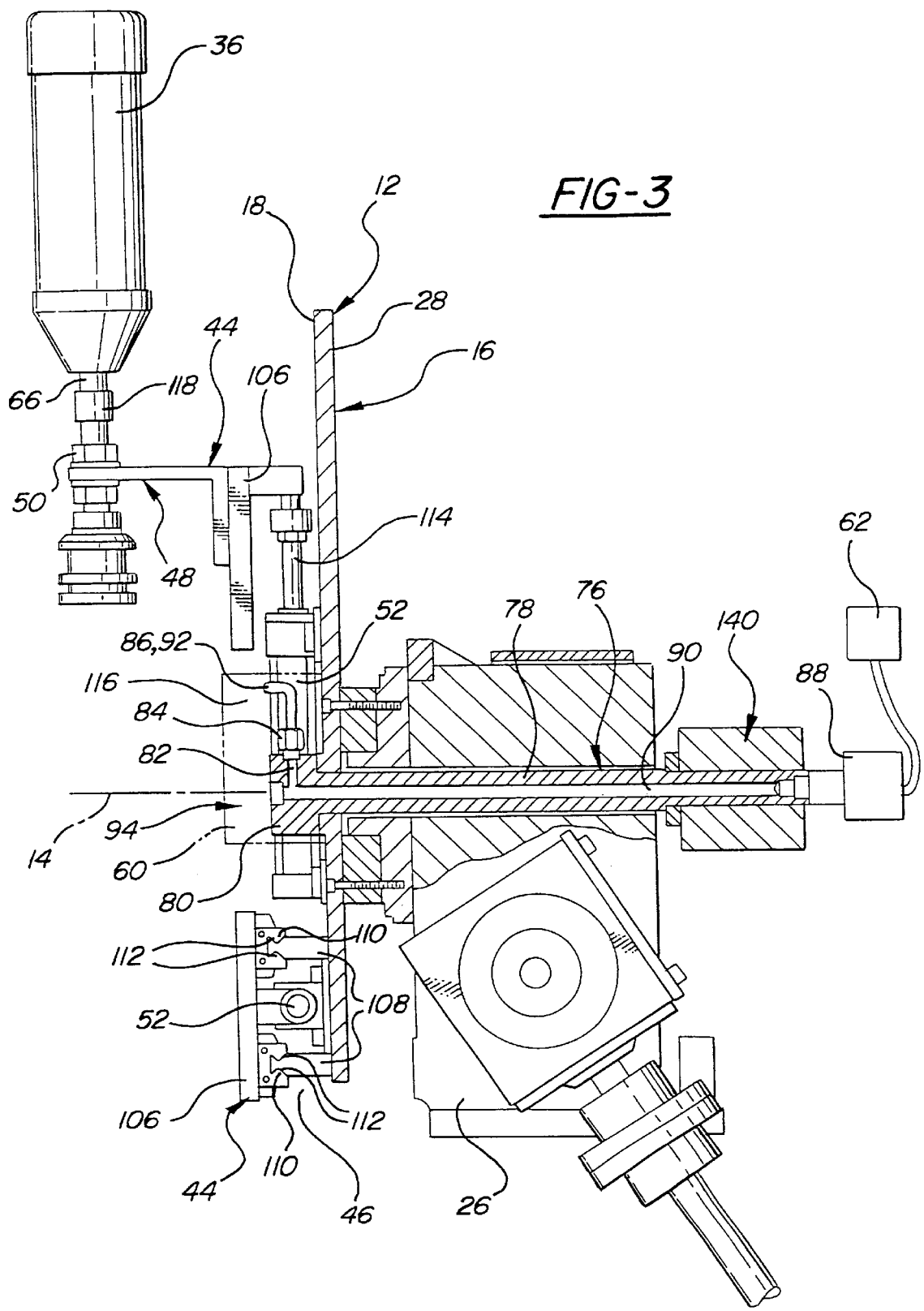
FIG. 3 is a partial cross-sectional side view of the rotary take-out apparatus of FIGS. 1 and 2 taken along line 3—3 of FIG. 2.

Each of the two pick-up heads 50 in each of the four pick-up head arrays 48 is configured to releasably grasp a blow molded article 36 while in its respective extended position. Four cylinder valves, shown 60 in FIGS. 2–4, are supported on the take out carrousel mounting plate 16 and are each connected between a pressurized air source, shown at 62 in FIG. 3, and the first and second chambers 56, 58 of one of the four air cylinders 52. The cylinder valves 60 are each configured to alternately divert differential fluid pressure to one of the first and the second chambers 56, 58 in their respective air cylinders 52 at one time to extend and retract their respective pick-up head arrays 48.

A controller, shown at 64 in FIG. 4 as comprising a microprocessor, is connected to the cylinder valves 60. The controller 64 is configured or programmed to operate the cylinder valves 60 to coordinate the extension and retraction of the four pick-up head arrays 48 with the motion of the take-out carrousel 12, the motion of the mold carrousel 20 and the opening and closing of the molds 32 at the article take-out work station 40.

The controller 64 is programmed to cause the apparatus 10 to "reach out" and grasp blow-molded articles 36 and then to remove the blow-molded articles 36 from respective mold cavities 34 once the mold sections have opened. More specifically, the controller 64 commands the pick-up heads 50 to move reciprocally between the extended and retracted positions. This allows the heads 50 to be readily inserted into openings 66 in blow molded articles 36 when the openings 66 are outwardly oriented, e.g., radially or tangentially, with respect to the mold carrousel axis 22. The controller 64 is also programmed to cause the apparatus 10 to extend and to release the articles 36 in an upright attitude onto a flat surface at a point spaced from the mold carrousel 20.

The controller 64 causes the two pick-up heads 50 in each pick-up head array 48 to releasably grasp two blow molded articles 36 disposed in the two cavities 34 of a mold station 30 paused at the article take-out work station 40 when the pick up head array 48 is in the extended position and before the mold 32 opens. The controller 64 is configured to move the pick-up head array 48 to the extended position when the pick-up station 44 is in the take-out position 46 and a mold station 30 is paused at the article take-out work station 40. This allows the take-out apparatus 10 to grasp and remove two blow-molded articles 36 at a time from the molds 32 of a mold carrousel mold station 30 while the take-out carrousel 12 and mold carrousel 20 are both stationary. The two pick up heads 50 of each pick-up head array 48 continue to hold onto the articles 36 as that pick-up head array 48 moves to the retracted position and the take-out carrousel 12 rotates the pick-up head array 48 in a clockwise direction (as viewed in FIG. 1) out of the take-out position 46.

The controller 64 causes both pick-up heads 50 in each pick-up head array 48 to release the articles 36 they are holding once the take-out carrousel 12 has rotated the pick-up station 44 to a release position shown at 68 in FIGS. 1 and 2. As shown in FIG. 1 the pick-up head arrays 48 release two articles 36 at a time onto a conveyor belt shown at 70 in FIG. 1. The pick up head arrays 48 release the articles 36 in upright positions to facilitate other operations that may then be carried out on the articles 36 such as filling and capping the articles 36. As is also shown in FIG. 1 the controller 64 may delay releasing the articles 36 in the release position 68 to hold the articles 36 momentarily in a position over a tail trimmer mechanism shown at 72 in FIG. 1. The tail trimmer 70 removes tail flash from each article 36 as is described in greater detail in the '217 patent. The description of the tail trimmer in the '217 patent is incorporated herein by reference.

As is best shown in FIG. 1, the four pick-up stations 44 are disposed such that one of the stations 44 is disposed in the take-out position 46 whenever another of the stations 44 is disposed in the release position 68. This arrangement minimizes take-out carrousel pauses because two operations are performed each time the take-out carrousel 12 pauses.

The take-out carrousel 12 includes a hollow hub generally indicated at 76 in FIGS. 1–3. The hub 76 is coaxially disposed along the take-out carrousel axis 14 and includes a hollow cylindrical hub shaft shown at 78 in FIG. 3. As is best shown in FIG. 3, the hub shaft 78 integrally and axially extends from a hollow cylindrical hub manifold block 80. The hub manifold block 80 includes four radially-extending, circumferentially-spaced hub through-holes shown at 82 in FIG. 3. The hub through-holes 82 extend through a circumferential wall of the hub manifold block 80 as is best shown in FIG. 3. Each hub through-hole 82 is threaded to receive one end of a pneumatic coupling 84 in an outer end of each through-hole 82. One of the pneumatic couplings 84 is threadedly engaged in each of the four hub through holes 82. The pneumatic couplings 84 are each configured to attach one end of a pneumatic line or hose 86 to the hub manifold block 80.

A rotary union, shown at 88 in FIG. 3, is connected to the hub 76 at an end of the hub shaft 78 opposite the hub manifold block 80. The rotary union 88 provides fluid communication between the hub 76 and the source 62 of positive fluid pressure, preferably pressurized air. The source 62 of pressurized air is disposed in a stationary position adjacent the carrousel and does not rotate with the carrousel. A fluid channel 90 extends from the source 62 of pressurized air through the rotary union 88 and hub 76 then branches into four channels 92 that extend from the hub 76 through four respective four-way valves 94 generally indicated at 94 in FIGS. 2–4. The four channels 92 are defined by the four pneumatic lines or hoses 86 that connected between respective hub manifold couplings 84 and the four four-way valves 94.

At the four-way valves 94 each of the four channels 92 branches into three channels shown at 102 in FIGS. 2 and 4. The three channels 102 extend from each four-way valve 94 to the two chambers 54, 58 of the air cylinder 52 and the pick-up heads 50, respectively. The three channels 102 extending from each four-way valve 94 are defined by flexible pneumatic lines or hoses 104 that connect and provide fluid communication between each four-way valve 94 and the pick-up heads 50 and between each four-way valve 94 and the two chambers of each air cylinder 52. Each length of pneumatic hose 86, 104 joins a pneumatic coupling 84 at each end configured to threadedly engage holes in the hub 76, the four-way valves 94 and the cylinders 52.

Each four-way valve 94 includes one of the cylinder valves 60 as shown diagrammatically in FIG. 4. Each cylinder valve 60 is connected by the lengths of pneumatic hose 104 between the hub 76 and the first and second chambers 56, 58 of one of the cylinders 52. In other words a cylinder valve 60 is included in each of the four-way valves 94 and is therefore supported on the take out carrousel mounting plate 16 adjacent each of the cylinders 52 for the purpose of controlling the flow of pressurized air to that cylinder 52. Each cylinder valve 60 connects one of the fluid channels 92 leading from the hub 76 to the pair of fluid channels 102 (hoses 104) leading to the respective first and second chambers 56, 58 of one of the cylinders 52.

The controller 64 is connected to each cylinder valve 60 and is configured or programmed to operate each cylinder valve 60. Because it operates each of the cylinder valves 60, the controller 64 is able to coordinate extension and retraction of each pick-up head arrays 48 with the motion of the mold carrousel 20 and the opening and closing of the molds 32 at the article take-out work station 40. In other words, the controller 64 individually and sequentially positions the cylinder valves 60 at each pick-up station 44 such that the pick-up head array 48 at each pick-up station 44 will extend as each pick-up station 44 pauses in the take-out position 46 and a mold 32 pauses at the article take-out work station 40. The controller 64 causes each cylinder valve 60 to direct pressurized air to the second chamber 58 of each air cylinder 52 after the pick-up heads 50 of each array 48 have engaged blow-molded articles 36 within the mold cavities 34 and after the mold 32 has opened to release the articles 36. This causes each pick-up head array 48 to retract only after the pick-up heads 50 have engaged the articles 36 and the mold halves have separated and are clear. In this way the controller 64 operates the cylinder valves 60 to coordinate the extension and retraction of the pick-up head arrays 48 with the indexed motion of the mold carrousel 20 and the opening and closing of molds 32 paused at the article take-out work station 40.

A platform, shown at 106 in FIGS. 2 and 3, is slidably mounted on the take out carrousel mounting plate 16 at each pick-up station 44. Each pick up head array 48 is supported on one of the four platforms 106. Each of the four platforms 106 is configured to smoothly transport a pick up head array 48 reciprocally between the extended and retracted positions.

Four pairs of parallel rails, shown at 108 in FIGS. 1–3, are mounted on the take out carrousel mounting plate 16. One pair of the rails 108 is positioned tangent to and spaced from the take-out carrousel axis 14 at each of the four pick-up stations 44. Each platform 106 includes rail engagement brackets shown at 110 in FIG. 3. The rail engagement brackets 110 are slidably engaged with the rails 108. As shown in FIG. 3, the brackets 110 have generally U-shaped cross sections that include triangular, opposed protrusions 112. The protrusions 112 are shaped to engage complementary elongated triangular indentations in the rails 108. The engagement between the triangular protrusions 112 and complementary indentations slidably secures the platforms 106 to their respective rails 108.

As is best shown in FIG. 2, a forward end of each cylinder 52 is disposed between an aft end of each pair of rails 108. A reciprocating rod portion 114 of each cylinder 52 is attached to each platform 106 to drive each platform 106 reciprocally along its respective pair of rails 108.

The apparatus 10 is configured to release blown articles 36 in an upright position. As is best shown in FIG. 1, the controller 64 is programmed to cause the pick-up heads 50 to release blow-molded articles 36 when the articles 36 have reached a position in which they are in an upright attitude above the conveyor belt 70 and/or a tail-flash trimming device.

A head valve, shown at 116 in FIGS. 2–4, is included in each of the four-way valves 94 supported on the take out carrousel mounting plate 16. Each head valve 116 is connected between one of the pick-up head arrays 48 and the hub 76. Each four-way valve 94 channels pressurized air to its respective head valve 116 from the pneumatic hoses 86 leading from the hub 76 to each four-way valve 94. Each head valve 116 is individually actuable to control the flow of pressurized air from the hub 76 to the pick-up heads 50 in one of the pick-up head arrays 48 in response to electrical control inputs from the controller 64. Each pick up head 50 in each pick-up head array 48 is configured to alternately grasp and release a blow-molded article 36 in response to changes in the controlled flow of differential fluid pressure.

The controller 64 is connected to each of the four head valves 116 and is configured or programmed to coordinate individual head valve actuation with the reciprocal motion of the pick up head arrays 48 and the rotation of the take-out carrousel 12. In other words, the controller 64 and head valve 116 are configured to control fluid communication, i.e., the flow of pressurized air, between the source 62 of pressurized fluid and each pick up head 50 in the array 48. Each pick up head 50 is individually actuable to releasably grasp a blow-molded article 36 in response to an increase in air pressure supplied to the pick up heads 50. The controller 64 is connected to the head valves 116 and is configured or programmed to coordinate pick up head actuation with the motion of the pick up head arrays 48 and the take-out carrousel 12 so that the pick up heads 50 actuate when they are inside the openings 66 in the necks of blow molded articles 36. The controller 64 positions each head valve 116 to cause the pick up heads 50 to stay actuated until the take-out carrousel 12 has rotated to the release position 68.

As is best shown in phantom in FIG. 3 and diagrammatically in FIG. 4, each pick-up head 50 includes an expandable pin 118 configured to fit inside the opening 66 in the neck or mouth portion of a blow-molded article 36. The expandable pins 118 in each pick-up head array 48 are configured to inflate when a head valve 116 admits pressurized fluid to the pick-up heads 50 in that pick-up head array 48. When inflated, the pins 118 engage inner surfaces of the neck or mouth portions of the blow-molded article 36. The pins 118 in each pick-up head array 48 are configured to deflate and release the articles 36 when a head valve 116 blocks the flow of pressurized fluid from the hub 76 to the pins 118 and pressurized fluid is released from the pins 118. The use of expandable pins 118 allows the take-out carrousel 12 to be used with mold carrousels that radially present an open mouth or neck portion of newly blow-molded articles 36 rather than a flat, smooth outer surface that would call for a suction-type pick-up device. Any suitable blow pin or blow pin assembly may be used in the invention to include the blow pin assembly described in detail in U.S. Pat. No. 4,919,607 to Martin et al. The Martin et al. patent is assigned to the assignee of the present invention and incorporated herein by reference.

As shown in FIG. 4, ten slip rings 120–138 are coaxially disposed around the hub 76. The slip rings 120–138 are part of a slip ring assembly generally indicated at 140 in FIG. 3. The slip ring assembly 140 is configured to complete electrical circuits and transmit electrical power and control signals between the remotely mounted controller 64 and solenoid actuators in the cylinder valves 60. The slip rings 120–138 are configured to transmit electrical power and signals between the controller 64 and solenoid actuators in the head valves 116. As shown in FIG. 4, one slip ring shown at 138 serves as a common ground, one shown at 136 serves as a common hot, and four pairs of additional rings 120, 122; 124, 126; 128, 130 and 132, 134 accommodate control circuits for the head valves 116 and cylinder valves 60. In each of the four pairs, one slip ring 120, 124, 128, 132 provides an electrical signal connection to control a solenoid-operated head valve 116 and the other slip ring 122, 126, 130, 134 provides an electrical signal connection to control a solenoid-operated cylinder valve 60.

In other embodiments, the take-out carrousel axis 14 and mold carrousel axis 22 may be other than parallel. In addition, fluid cylinders 52 other than air cylinders may be employed to drive the pick-up head arrays 48. Other embodiments may also include air cylinders driven by other forms of differential fluid pressure, e.g., negative pressure or suction, rather than positive air pressure.

In practice, the rotary take-out apparatus 10 may be used to remove hollow blow-molded articles 36 from the rotary blow-molding machine by first positioning the rotary take-out carrousel 12 such that the take-out position 46 of the take-out carrousel 12 is disposed adjacent the article take-out work station 40 of the mold carrousel 20. One of the rotary blow-molding machine mold stations 30 is then rotated to, and paused at, the article take-out work station 40. At the same time, one of the pick-up stations 44 is rotated to and paused in the take-out position 46. The controller 64 then sends an electrical signal to the cylinder valve 60 which commands the valve to divert pressurized air into the first chamber 54 of the cylinder 52 causing the pick-up head array 48 disposed at the pick-up station 44 to move to its extended position.

As the pick up head array 48 moves to its extended position the expandable pin portions 118 of the two pick-up heads 50 in the array 48 advance into the respective openings 66 in two blow-molded articles 36 contained in the mold station 30 on the mold carrousel 20. The controller 64 then sends electrical signals to the head valve 116 commanding the head valve 116 to admit pressurized air into the two expandable pins 118. When the head valve 116 admits pressurized air into the expandable pins 118, the pins 118 inflate and grasp the two blow-molded articles 36 by expanding outward into engagement with respective inner surfaces of the neck openings 66 in the articles 36. The expandable pins 118 are shaped to engage the opening 66 in the necks of a blow-molded bottles but, in other embodiments, may be shaped and sized to grip openings of various sizes and shapes in articles of various types.

Once the expandable pins 118 have grasped the blow-molded articles 36, the molds 32 containing the blow-molded articles 36 are then opened. The controller 64 then sends electrical signals to the cylinder valve 60 commanding the cylinder valve 60 to direct pressurized air to the first chamber 54 of the cylinder 52 which causes the cylinder 52 to move the pick-up head array 48 to its retracted position clear of the molds 32.

The pick-up station 44 is then rotated through two intermediate positions, shown at 142 and 144 in FIGS. 1 and 2, before pausing at the release position 68. The pick-up station 44 is paused at each of the two intermediate positions 142, 144. As the pick-up station 44 is paused at each of the intermediate positions 142, 144 and at the release position 68, the above process is repeated for the other three pick-up stations 44 on the take-out carrousel 12 and for the next three mold stations 30 on the mold carrousel 20 at the article take-out work station 40.

Once the pick-up station 44 reaches and is paused in the release position 68, the controller 64 signals the cylinder valve 60 to divert pressurized air away from the second chamber 58 of the cylinder 52 and into the first chamber 54 of the cylinder 52 which causes the pick-up head array 48 to return to its extended position. When the array 48 returns to its extended position, base portions of the two attached blow-molded articles 36 engage the tail trimmer mechanism 70 to remove any tail flash that may be extending from the base portions of the articles 36.

When the tail trimming operation is complete, the controller-sequencer then signals the head valve 116 to block the flow of pressurized air to the expandable pins 118 and to release accumulated air pressure from the pins 118. The release of pressurized air causes the expandable pins 118 to release the blow-molded articles 36 in an upright attitude onto the conveyor belt 70 after the tail trimmer mechanism 72 has been moved aside. The controller 64 then signals the cylinder valve 60 to divert pressurized air away from the first chamber 54 and into the second chamber 58 which causes the pick-up head array 48 to retract. The pick-up station 44 is then rotated back to the take-out position 46 adjacent the article take-out work station 40 completing an article take-out cycle and positioned to commence another cycle.

I intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims.

I claim:

1. A rotary take-out apparatus for sequentially removing blow molded hollow articles from each of a plurality of molds that are mounted on a rotary mold carrousel in a rotary blow-molding machine, the apparatus comprising:

a take-out carrousel supported for rotation about a take-out carrousel axis;

a take-out carrousel drive operatively connected to the take-out carrousel and configured to cause the take-out carrousel to rotate around the take-out carrousel axis;

a pick-up station supported on the take-out carrousel to rotate along a circular pick-up station path and including a pick-up head array comprising at least one pick-up head;

a fluid cylinder supported on the take-out carrousel and operatively connected to the pick-up head array, the cylinder configured to move the pick-up head array to an extended position when differential fluid pressure is directed to a first chamber in the cylinder, the cylinder configured to move the pick-up head array to a retracted position when differential fluid pressure is diverted from the first chamber to a second chamber in the cylinder, each pick-up head configured to releasably grasp a blow molded article while in the extended position;

a cylinder valve supported on the take-out carrousel and connected between a source of differential fluid pressure and the cylinder, the cylinder valve configured to alternately divert differential fluid pressure to one of the first and the second chamber in the cylinder; and a controller connected to the cylinder valve and configured to operate the cylinder valve to coordinate pick-up head extension and retraction with the motion of the take-out carrousel and the motion of the mold carrousel and the opening and closing of the molds at the article take-out work station on the mold carrousel to grasp and remove blow-molded articles from mold carrousel molds and release them at a point spaced from the mold carrousel.

2. A rotary take-out apparatus as defined in claim 1 in which at least two of the pick-up stations are disposed at circumferentially-spaced locations on the take-out carrousel, each pick-up station including a pick-up head array;

at least two of the cylinders are supported on the take-out carrousel, each cylinder operatively connected to one of the pick-up head arrays;

at least two of the cylinder valves supported on the take-out carrousel, each cylinder valve connected between the hub and the first and second chambers of one of the cylinders;

at least one fluid channel extending from the hub to the cylinder valves; and the controller connected to each cylinder valve and configured to operate each cylinder valve to coordinate extension and retraction of each pick-up head array with the motion of the mold carrousel and the opening and closing of the molds at the article take-out work station.

3. A rotary take-out apparatus as defined in claim 2 in which:

the take-out carrousel includes a hollow hub portion coaxially disposed along the take-out carrousel axis;

a rotary union is connected to the hub, the rotary union providing fluid communication between the hub and a source of differential fluid pressure disposed adjacent the carrousel; and at least one fluid channel extending from the source of differential fluid pressure through the rotary union and hub to the chambers of the fluid cylinder.

4. A rotary take-out apparatus as defined in claim 2 further including a platform movably mounted on the take-out carrousel at each pick-up station, each pick up head array being supported on one of the platforms, each platform being configured to transport a pick up head array reciprocally between the extended and retracted positions.

5. A rotary take-out apparatus as defined in claim 4 further including a pair of parallel rails mounted on the take-out carrousel at each pick-up station, each platform slidably mounted for reciprocal motion on one of the pairs of parallel rails.

6. A rotary take-out apparatus as defined in claim 1 and further configured to release blown articles in an upright position.

7. A rotary take-out apparatus as defined in claim 2 in which the take out carrousel drive is configured to index the rotation of the take-out carrousel to synchronize with the indexed rotation of a mold carrousel.

8. A rotary take-out apparatus as defined in claim 3 further including at least two head valves supported on the carrousel, each head valve being connected between one of the pick-up head arrays and the hub, each head valve being individually actuable to control the flow of differential fluid pressure from the hub to the pick-up heads in one of the pick-up head arrays, each pick up head being configured to alternately grasp and release a blow-molded article in response to changes in the controlled flow of differential fluid pressure, the controller connected to the head valves and configured to coordinate individual head valve actuation with the reciprocal motion of the pick up head arrays and the rotation of the take-out carrousel.

9. A rotary take-out apparatus as defined in claim 8 in which each pick-up head includes an expandable pin, the expandable pins in each pick-up head array being configured to inflate when a head valve admits pressurized fluid to the pick-up heads in that pick-up head array, the pins in each pick-up head array being configured to deflate when a head valve blocks the flow of pressurized fluid from the hub to the pins and pressurized fluid is released from the pins.

10. A rotary take-out apparatus as defined in claim 8 further including at least two four-way solenoid valves supported on the carrousel, each four-way solenoid valve including one of the cylinder valves and one of the head valves.

11. A rotary take-out apparatus as defined in claim 8 further including a plurality of slip rings disposed around the hub and configured to complete electrical circuits between the controller and the cylinder valves and between the controller and the head valves.

12. A rotary blow-molding apparatus of the type for blow-molding hollow articles, the apparatus comprising:

a support frame;

a mold carrousel supported on the frame for rotation about a central mold carrousel axis;

a mold carrousel drive operatively connected to the carrousel and configured to rotate the mold carrousel about the mold carrousel axis;

at least two mold stations supported on the mold carrousel to rotate along a circular mold station path, each mold station including at least one mold, each mold including a pair of mold sections closeable and openable by reciprocal movement toward and away from one another and defining a mold cavity when in the closed position, the mold cavity adapted to shape and hold a blow molded article during blow molding;

at least two work stations disposed adjacent the support frame and angularly spaced from each other around the mold station path, one of the work stations being an article take-out work station;

a mold section reciprocator operable to open the molds of each mold station as each mold station arrives at the article take-out work station;

the mold carrousel drive including an indexer operatively connected to the carrousel and configured to pause the mold carrousel in a number of indexing positions, the indexing positions and work stations being angularly spaced so that each mold station pauses in angular alignment with each work station allowing operations to be performed on each mold station at each work station; and a rotary take-out apparatus comprising:

a take-out carrousel supported for rotation about a take-out carrousel axis;

a take-out carrousel drive configured to rotate the take-out carrousel about the take-out carrousel axis;

a pick-up station supported on the take-out carrousel to rotate along a circular pick-up station path between a take-out position adjacent the article take-out work station and a release position displaced from the article take-out work station, the pick up station including a pick-up head array comprising at least one pick-up head, the take-out carrousel drive including an indexer operatively connected to the carrousel and configured to pause the take-out carrousel when the pick-up station is disposed in the take-out position, the pick-up head array being reciprocally moveable between an extended position and a retracted position, each pick-up head configured to releasably grasp a blow molded article disposed in a mold paused at the article take-out work station while the pick up head array is in the extended position and to release the article once the take-out carrousel has rotated the pick-up station to the release position; and a controller operatively connected to the pick-up head array and configured to move the pick-up head array to the extended position when the pick-up station is in the take-out position and a mold is paused at the article take-out work station thereby allowing the take-out apparatus to grasp and remove blow-molded articles from the molds of a mold carrousel while the take-out carrousel and mold carrousel are stationary.

13. A rotary blow molding apparatus as defined in claim 12 in which the take-out carrousel axis is disposed parallel to the mold carrousel axis.

14. A rotary blow molding apparatus as defined in claim 12 further including a fluid cylinder supported on the take-out carrousel and operatively connected to the pick-up head array, the cylinder being configured to reciprocally drive the pick-up head array between an extended position and a retracted position in response to changes in fluid pressure supplied to the cylinder.

15. A rotary blow molding apparatus as defined in claim 14 in which:
the fluid cylinder is configured to move the pick-up head array to an extended position when differential fluid pressure is directed to a first chamber in the cylinder; and
the cylinder is configured to move the pick-up head array to a retracted position when differential fluid pressure is directed to a second chamber in the cylinder.

16. A rotary blow molding apparatus as defined in claim 15 in which:
a cylinder valve is supported on the take-out carrousel and is connected between a source of differential fluid pressure and the first and second chambers of the cylinder, the cylinder valve configured to alternately divert differential fluid pressure to the first and second chambers of the cylinder; and
the controller being connected to the cylinder valve and configured to coordinate pick-up head extension and retraction with the motion of the take-out carrousel and the motion of the mold carrousel and the opening and closing of the molds at the article take-out work station on the mold carrousel.

17. A rotary take-out apparatus as defined in claim 12 further including a head valve supported on the carrousel and connected between the pick up head array and a source of pressurized fluid, the head valve configured to control fluid communication between the source of pressurized fluid and each pick up head in the array, each pick up head being actuable to releasably grasp a blow-molded article in response to a change in fluid pressure supplied to the pick up heads; the controller connected to the head valves and configured to coordinate pick up head actuation with the motion of the pick up head arrays and the take-out carrousel.

18. A rotary blow molding apparatus as defined in claim 17 in which each pick-up head includes an expandable pin, the head valve being connected between the source of pressurized fluid and the expandable pins and configured to control inflation and deflation of the pins.

19. A rotary blow molding apparatus as defined in claim 18 in which each expandable pin is configured to inflate when the head valve admits pressurized fluid to the pick-up heads in the pick-up head array, the pins being configured to deflate when the head valve blocks the flow of pressurized fluid from the hub to the pins and pressurized fluid is released from the pins.

20. A rotary take-out apparatus as defined in claim 16 in which:
at least two of the pick-up stations are disposed at circumferentially-spaced locations on the take-out carrousel, each pick-up station including a pick-up head array;
at least two of the cylinders are supported on the take-out carrousel, each cylinder being operatively connected to one of the pick-up head arrays;
at least one fluid channel extends from the source of differential fluid pressure to each of the fluid cylinders;
a cylinder valve is supported on the take-out carrousel for each of the cylinders, each cylinder valve connecting a fluid channel from the source of differential fluid pressure to a pair of fluid channels leading to the respective first and second chambers of one of the cylinders; and
the controller is connected to each cylinder valve and is configured to operate the cylinder valves to extend and retract the pick-up head array at each pick-up station as each pick-up station pauses in the take-out position and a mold pauses at the article take-out work station.

21. A rotary blow molding apparatus as defined in claim 17 in which:
at least two of the head valves are supported on the take-out carrousel;
each head valve is connected between a source of differential fluid pressure and the pick-up heads of one of the pick-up head arrays; and
the controller is connected to each head valve and is configured to open each head valve to provide differential fluid pressure to actuate the pick-up heads of the pick-up head array to engage a blow-molded article.

22. A rotary blow molding apparatus as defined in claim 12 and including an even number of the pick-up stations supported on the take-out carrousel and disposed such that one of the pick-up stations is disposed in the take-out position whenever another of the pick-up stations is disposed in the release position.

23. A rotary blow molding apparatus as defined in claim 12 in which the take-out carrousel drive is operatively connected to the mold carrousel drive and is configured to pause the take-out carrousel such that a pick up station is disposed in the take-out position when a mold is disposed at the article take-out work station.

24. A method for making hollow blow-molded articles using a rotary blow-molding apparatus comprising a mold carrousel supported for rotation about a central mold carrousel axis, at least two mold stations supported on the mold carrousel to rotate along a circular mold station path, each mold station including a mold, each mold having a mold cavity and being openable to release the contents of the cavity, the mold cavity configured to shape and hold a blow molded article during blow molding, an article take-out work station disposed adjacent the support frame in the mold station path, and a rotary take-out apparatus comprising a take-out carrousel supported for rotation about a take-out carrousel axis, and a pick-up station supported on the take-out carrousel to rotate along a circular pick-up station path between a take-out position adjacent the article take-out work station and a release position displaced from the article take-out work station, the pick up station including a pick-up head configured to grasp a blow-molded article; the method comprising the steps of:

positioning the rotary take-out carrousel such that the article take-out work station is disposed adjacent the take-out position of the take-out carrousel;

rotating a mold containing a blow-molded article to the article take-out work station;

rotating one of the pick-up stations to the take-out position;

moving a pick-up head disposed at the pick-up station to an extended position adjacent the blow-molded article;

causing the pick-up head to grasp the blow-molded article disposed in the mold at the article take-out work station;

opening the mold containing the blow-molded article after the pick-up head has grasped the article;

moving the pick-up head to a retracted position clear of the mold;

rotating the pick-up station to the release position; and causing the pick-up head to release the blow-molded article.

25. The method of claim 24 in which the step of rotating a mold includes the additional step of pausing the mold carrousel with the mold at the article take-out work station and in which the step of rotating one of the pick-up stations includes the step of pausing the take-out carrousel with the pick-up station in the take-out position.

26. The method of claim 24 in which the step of moving a pick-up head includes the step of inserting an expandable pin portion of the pick-up head into an opening in the blow-molded article and in which the step of causing the pick-up head to grasp the blow-molded article includes the step of inflating the expandable pin within the opening.

27. The method of claim 26 in which the step of inflating the expandable pin includes the additional step of providing pressurized fluid from a source of such pressurized fluid disposed off the take-out carrousel to the expandable pin supported on the take-out carrousel.

28. The method of claim 27 in which the step of inflating the expandable pin includes the additional step of sending electrical signals from a source disposed off the take-out carrousel to an electrically-controlled head valve supported on the take-out carrousel, the head valve configured to alternately admit and block the flow of pressurized fluid to the expandable pin.

29. The method of claim 24 in which the step of moving a pick-up head to an extended position and the step of moving the pick-up head to a retracted position each include the step of providing differential fluid pressure from a source of differential fluid pressure disposed off the take-out carrousel to a fluid cylinder mounted on the take-out carrousel, the cylinder being operatively connected to the pick-up head and configured to move the pick-up head between the extended and retracted positions.

30. The method of claim 29 in which the step of providing differential pressure to a fluid cylinder includes the step of sending electrical signals from a source disposed off the take-out carrousel to an electrically-controlled cylinder valve supported on the take-out carrousel, the cylinder valve configured to direct differential fluid pressure to portions of the cylinder that move the pick-up head between the extended and retracted positions in response to the electrical signals.

* * * * *